(12) United States Patent
Natarajan et al.

(10) Patent No.: US 8,925,894 B2
(45) Date of Patent: Jan. 6, 2015

(54) BALL VALVE ENCLOSURE AND DRIVE MECHANISM

(75) Inventors: Sivakumar Natarajan, Bangalore (IN); Robert Samuel Buchan, Aberdeen (GB); Thirupathi Dommati, Bangalore (IN)

(73) Assignee: Vetco Gray Inc., Houston, TX (US)

( * ) Notice: Subject to any disclaimer, the term of this patent is extended or adjusted under 35 U.S.C. 154(b) by 420 days.

(21) Appl. No.: 13/399,783

(22) Filed: Feb. 17, 2012

(65) Prior Publication Data

US 2013/0214189 A1 Aug. 22, 2013

(51) Int. Cl.
*F16K 5/06* (2006.01)

(52) U.S. Cl.
USPC .......... 251/1.1; 251/58; 251/279; 251/315.08

(58) Field of Classification Search
USPC ............................ 166/332.3; 251/58, 315.01, 251/315.08–315.09, 1.1, 279–280
See application file for complete search history.

(56) References Cited

U.S. PATENT DOCUMENTS

| | | | | |
|---|---|---|---|---|
| 3,741,249 A | * | 6/1973 | Leutwyler | 166/324 |
| 3,901,321 A | * | 8/1975 | Mott | 166/373 |
| 4,210,207 A | * | 7/1980 | McStravick et al. | 166/330 |
| 4,289,165 A | * | 9/1981 | Fredd | 166/332.3 |
| 4,368,871 A | * | 1/1983 | Young | 251/58 |
| 4,421,171 A | | 12/1983 | Haynes | |
| 4,448,216 A | * | 5/1984 | Speegle et al. | 137/630 |
| 4,475,598 A | * | 10/1984 | Brakhage et al. | 166/321 |
| 4,603,740 A | * | 8/1986 | Edwards et al. | 166/323 |
| 4,651,828 A | * | 3/1987 | Doremus | 166/319 |
| 4,700,782 A | * | 10/1987 | Read | 166/330 |
| 5,050,839 A | | 9/1991 | Dickson et al. | |
| 5,338,001 A | * | 8/1994 | Godfrey et al. | 251/192 |
| 6,152,229 A | | 11/2000 | Jennings | |
| 6,698,712 B2 | | 3/2004 | Milberger et al. | |
| 6,708,946 B1 | | 3/2004 | Edwards et al. | |
| 2009/0050332 A1 | * | 2/2009 | Cowie et al. | 251/58 |
| 2009/0065212 A1 | * | 3/2009 | DCosta et al. | 166/332.3 |

FOREIGN PATENT DOCUMENTS

| | | |
|---|---|---|
| EP | 0 679 796 A2 | 11/1995 |
| EP | 1 860 279 A1 | 5/2006 |
| EP | 2248991 A2 | 11/2010 |
| GB | 2323867 A | 10/1998 |
| GB | 2340860 A | 3/2000 |
| GB | 2369383 A | 5/2002 |
| WO | WO 2006/040592 A1 | 4/2006 |

OTHER PUBLICATIONS

Search Report from corresponding GB Application No. GB1302525.9 dated Mar. 4, 2013.

* cited by examiner

*Primary Examiner* — John Bastianelli
(74) *Attorney, Agent, or Firm* — Bracewell & Giuliani LLP

(57) ABSTRACT

A ball valve assembly includes an enclosure for supporting the ball valve during actuation. In one embodiment, the enclosure can be a split enclosure, and can have trunnion support apertures for engaging trunnions on the ball valve. In one embodiment, a pair of link arms are used to transfer force from a pair of actuation members to the ball valve. The link arms can be located in a recess on the actuation members, such the actuation members and the face of the trunnions define a cavity to enclose and protect the link arms.

20 Claims, 5 Drawing Sheets

BALL VALVE ENCLOSURE AND DRIVE MECHANISM

BACKGROUND OF THE INVENTION

1. Field of the Invention

The present invention relates in general to a ball valve and in particular to a ball valve having an enclosure for reducing deflection during operation.

2. Brief Description of Related Art

The ball of non-floating ball valves typically have trunnions protruding from the sides of the ball. The valve assembly generally includes a trunnion plate for supporting trunnions. Ball valves can stall before the end of their intended life cycles due to debris ingress, contamination formation, corrosion, and lubrication washout. These events can lead to over stressing and deformation of the mechanism, which can render the valve inoperable. Ball valves in high stress applications can be more susceptible to problems due to increased torque on the ball valve and the flat trunnion plates which support the ball.

SUMMARY OF THE INVENTION

In one embodiment of a ball valve assembly, a ball valve includes a split type enclosure around the ball. The enclosure can have aligned apertures for locating and supporting trunnions on the ball, which can provide increased support for the ball and better guidance during ball rotation. The valve can have top and bottom seats located within the split enclosure. Locking profiles, or grooves, in the enclosure can engage corresponding flanges on each of the top and bottom seats. Actuation arms on either side of the ball can be attached to a cross head through a double taper profile. The double taper profile can be a pair of grooves on the actuation arms that connect to a pair of flanges on the cross head. Link arms retained within the actuation arms can be connected to the ball via sleeve bearings and convert a piston axial force into rotational force for closing and shearing operation. A piston can be threaded to the crosshead to actuation the valve assembly.

In one embodiment, during rotation of the ball valve from the open to close position and reverse the ball trunnions can bear on the apertures in the spherical shaped split enclosure around the ball. Under high friction conditions, which could cause conventional single plate trunnions to deform, the enclosure can provide additional support and guidance and thus reduce overload in the drive mechanism. Optimum clearance can be provided between the enclosure and the ball, so that any solid contamination is less likely to settle down and hinder ball rotation. The actuation arm dual taper profile can be assembled with a similar mating profile in the crosshead with bolts in both sides. The bolts can create preloading between the actuation arm and crosshead to compensate for the radial force created by the piston axial force required for ball rotation during a stalled ball condition that may arise under high friction loading. A unique profile is made in the actuation arm to support the link arm and accommodate the link arm path during ball rotation from open to close and reverse. This profile can enclose the link arm and reduce the entrapment of debris in the supporting area. During upwards piston movement, the alignment of the ball passage with the flow path can be ensured by an alignment ring which can be fixed at the top of the both actuation arm. The alignment ring can be machined accordingly as it will touch the inner housing during the fully open condition. The alignment can be done by machining the ring before final assembly. It can also give structural stability for the top side of actuation arm during loading.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
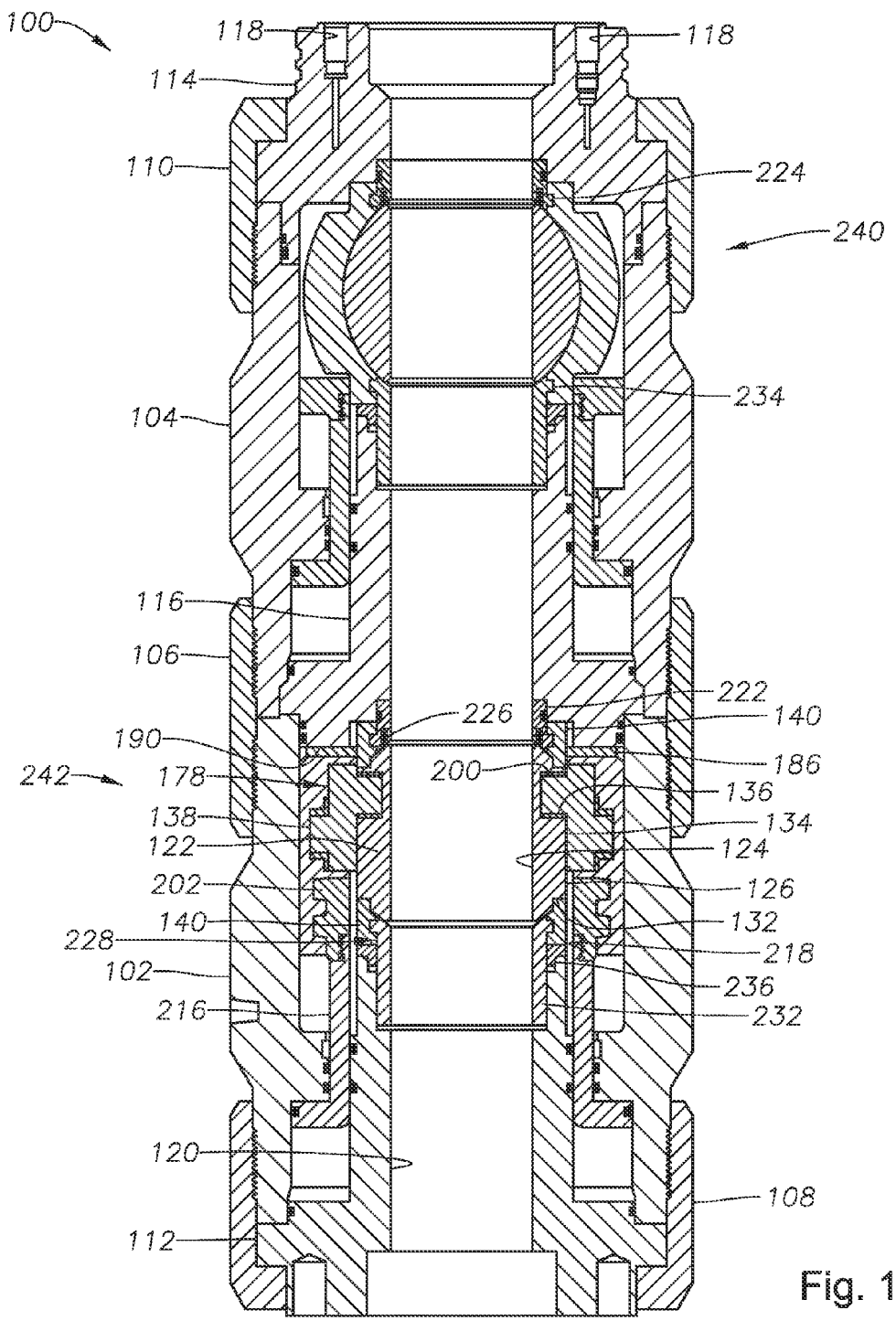
FIG. 1 is a partial sectional view of an exemplary embodiment of a valve assembly having a ball enclosure.

Referring to FIG. 1, valve assembly 100 can be located in a flowpath such as, for example, in a subsea wellhead. Valve assembly 100 can have an outer housing. In the embodiment shown in FIG. 1, the outer housing can include lower outer housing 102 and upper outer housing 104, which can be joined together by mid locking collar 106. Locking collars, such as lower locking collar 108 and upper locking collar 110, can be used to connect various housing elements. For example, lower locking collar 108 can be used to connect lower outer housing 102 to bottom housing 112. Similarly, upper locking collar 110 can be used to connect upper outer housing 104 to top housing 114. Inner housing 116 can be an annular member concentrically located within upper outer housing 104, lower outer housing 102, or within both, as shown in FIG. 1. Top housing can include hydraulic connections 118, although hydraulic connections can be located elsewhere.

Figure 2:
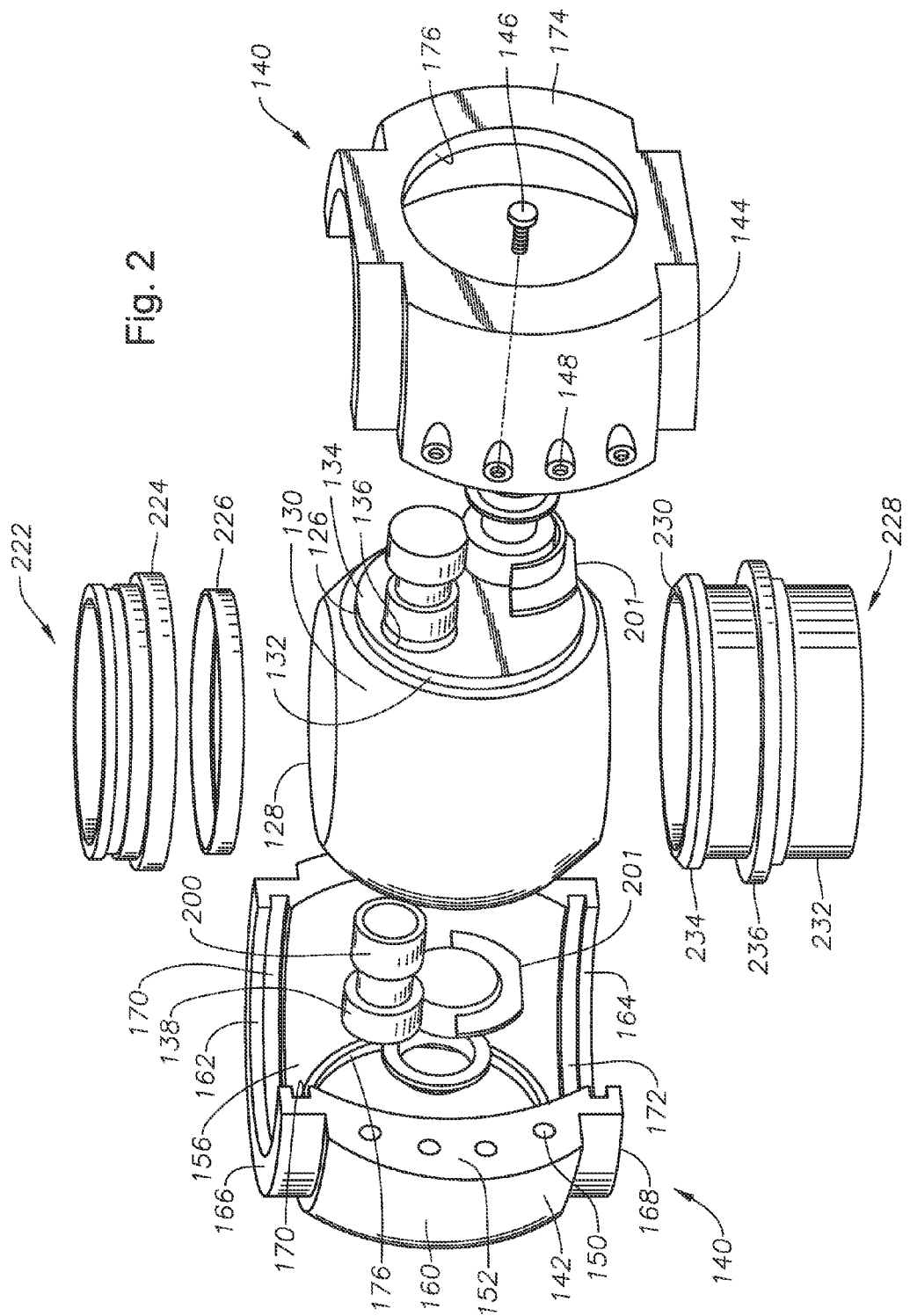
FIG. 2 is a assembly view of the ball and enclosure of the valve assembly of FIG. 1.
Figure 5:
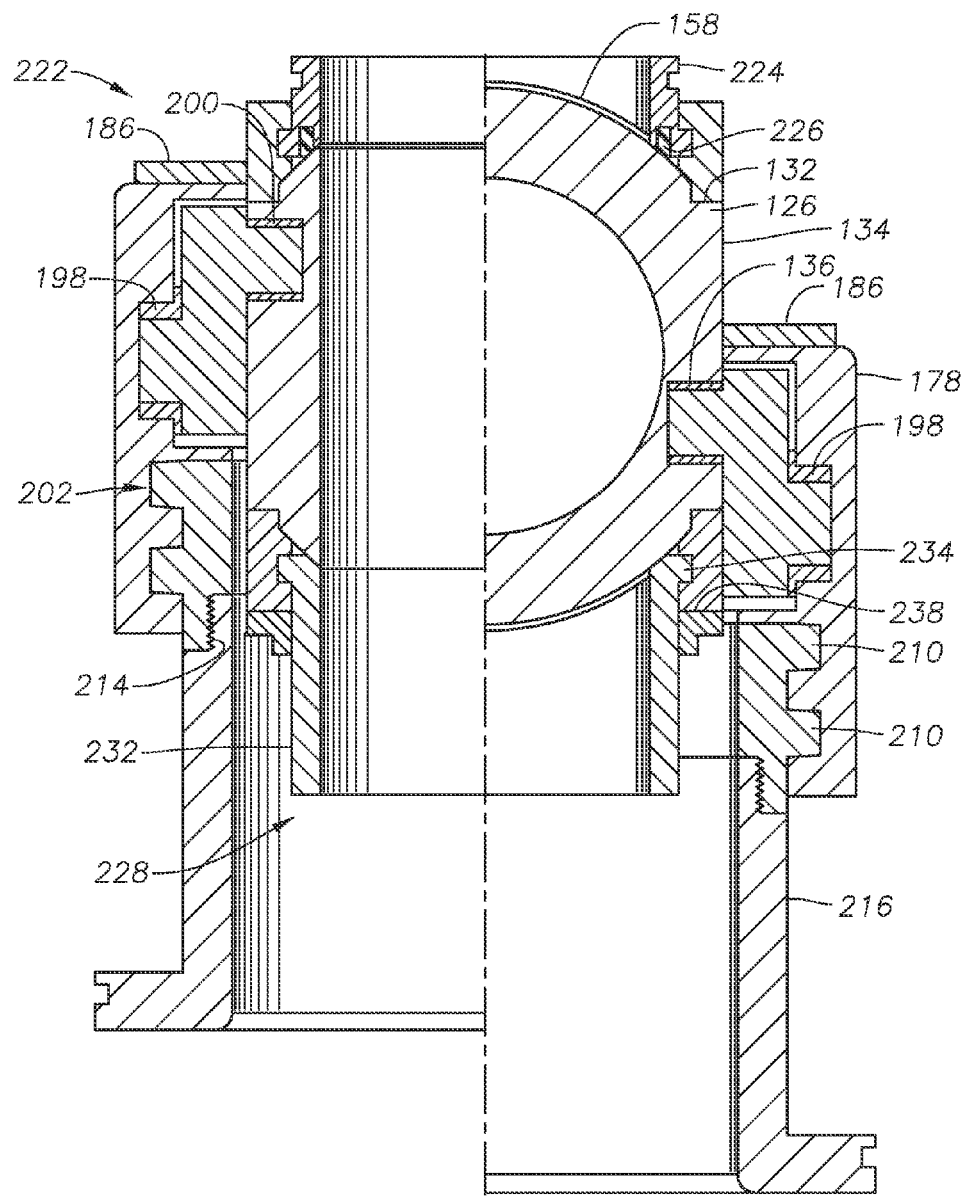
FIG. 5 is a split cross sectional view of the valve assembly of FIG. 1, showing a closed-valve condition on the left side and an open-valve condition on the right side.

Bore 120 can pass through valve assembly 100 to define a flow path. The axis of bore 120 can be generally the same as the axis of each of the housing components. Ball 122 can be used to sealingly close bore 120. Ball 122 is shown in the open position in FIG. 1. As best shown in FIGS. 2 and 5, ball 122 can have a generally spherical shape with the exception of passage 124 and trunnions 126. Passage 124 can be a cylindrical passage, or bore, through the center of ball 122. Open position sealing surface 128 can be a generally smooth surface around the opening of passage 124 at either or both ends of passage 124. Exterior surface 130 of ball 122 can be a generally smooth surface.

Trunnions 126 can be protrusions from the side of ball 122. In one embodiment, trunnions 126 can be cylindrical protrusions extending from the sides of ball 122, perpendicular to the axis of passage 124. Trunnions 126 can include trunnion sidewall 132. The end of trunnion 126 can be defined by trunnion face 134, which can be a generally flat surface parallel to the axis of passage 124. Trunnion face 134 can include a link connector for connecting a link arms 138 to trunnion 126, such as, for example, cylindrical recess 136 in trunnion face 134. The link connector can be offset from the axis of trunnion 126. In other embodiments, the link connector can be, for example, a stud or threaded connector protruding from trunnion face 134.

Ball Enclosure

Figure 3:
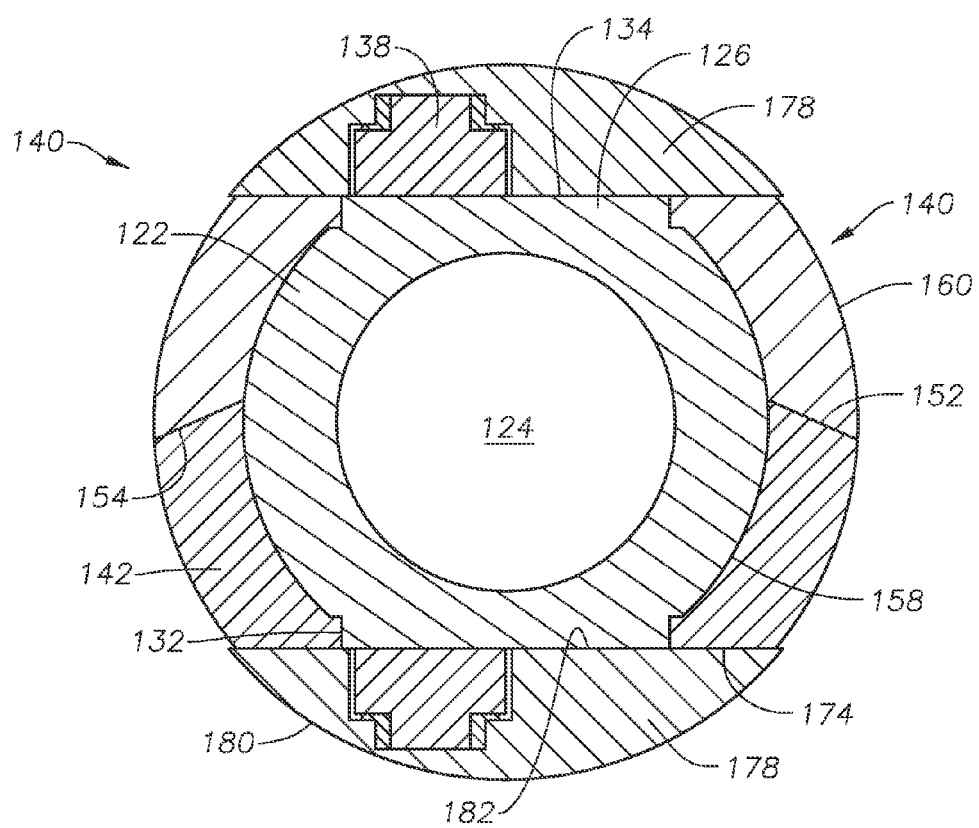
FIG. 3 is a cross sectional view of the valve assembly of FIG. 1, taken along the 3-3 line.

Referring to FIG. 2, ball enclosure 140 can be an enclosure for protecting and supporting ball 122. Ball enclosure 140, which can have a generally spherical shape, can include a left side enclosure 142 and a right side enclosure 144, which can be joined together to create enclosure 140. Left side enclosure 142 and right side enclosure 144 can be joined by, for example, threaded fasteners 146, which can pass through bolt holes 148 into tapped holes 150, as shown in FIG. 2. Alternatively, other methods can be used to join left side enclosure 142 and right side enclosure 144 such as, for example, nuts and bolts, welding or clamps. Some embodiments can use locator pins (not shown) to facilitate alignment of enclosure 140 components. The mating surfaces 152, 154 of left side enclosure 142 and a right side enclosure 144 can have a tapered profile wherein the joint between the mating surfaces extends at an angle, rather than perpendicularly, from the axis of the bore of ball 122, as shown in FIG. 3. The joint between the mating surfaces 152, 154 can extend axially, as shown in FIG. 2, or can be in other locations or configurations. For example, the components of ball enclosure 140 could be top and bottom components (not shown), with a joint surface that extends perpendicular to the axis of the bore. Left side enclosure 142 and a right side enclosure 144 can be generally symmetric with each other or one can have a different shape and different proportions than the other, provided that the assembly supports and protects ball 122 as described herein.

Ball enclosure 140 can have inner contoured surface 156 and outer surface 160. The shape of inner contoured surface 156 can be coextensive with the outer spherical surface of ball 122, thus generally matching the spherical shape of the exterior of ball 122. In one embodiment, inner contoured surface 156 can be a spherical interior that is coextensive with the spherical portions of the exterior of ball 122. The distance between inner contoured surface 156 and exterior surface 130 of ball 122 can be a gap 158 (FIG. 5) having a predetermined radial distance. The ends of ball enclosure 140 can have bore apertures 162 and 164, which can be radial openings having a diameter less than the diameter of ball 122. Enclosure cylindrical extensions 166, 168 can be a cylindrical member extending from ball enclosure 140. Bore apertures 162 and 164 can be defined by the ends of enclosure cylindrical extensions 166, 168. Upper seat rabbet 170 and lower seat rabbet 172 are annular grooves that can be located on interior walls of cylindrical extensions 166 and 168. Upper seat rabbet 170 and lower seat rabbet 172 define locking profiles for securing a lip of an annular member, such as lip 224 or upper seat 222 or lip 234 of lower bottom seat 228 (as will be described in more detail, below).

Enclosure sidewalls 174 can be exterior surfaces that are generally perpendicular to the bore axis of ball enclosure 140. Enclosure sidewalls 174 can have a generally flat surface or can have a contour. Trunnion support apertures 176 can be located in enclosure sidewalls 174. Each trunnion support aperture 176 can be a cylindrical aperture sized to accommodate and support trunnion 126. The spherical shape of ball enclosure 140 can provide support to trunnion support aperture 176, and that support can prevent trunnion support aperture 176 from flexing in response to torque from trunnion 126. Furthermore, the tapered profile of mating surfaces 152, 154 can provide strength and reduce deflection in the vicinity of trunnion support aperture 176.

Actuation Arms

As best shown in FIGS. 1 and 3-5, actuation members, such as actuation arms 178, can be used to transfer force to ball 122. In one embodiment, when viewed from above, actuation arms 178 can have a semicircular or "half-moon" shape, as shown in FIG. 3. In this embodiment, actuation arm outer surface 180 can have a smooth, contoured shape. Actuation arm inner surface 182 which is the surface that faces ball 122 (thus defined as a ball facing surface) can have a generally flat shape. The actuation arm inner surface can be generally parallel to trunnion face 134 and enclosure sidewalls 174. When actuation arms 178 are located alongside enclosure sidewalls 174, the exterior surfaces of the assembly can have a generally spherical shape. Actuation arms 178 can have other shapes including, for example, a polygonal outer surface (not shown).

Figure 4:
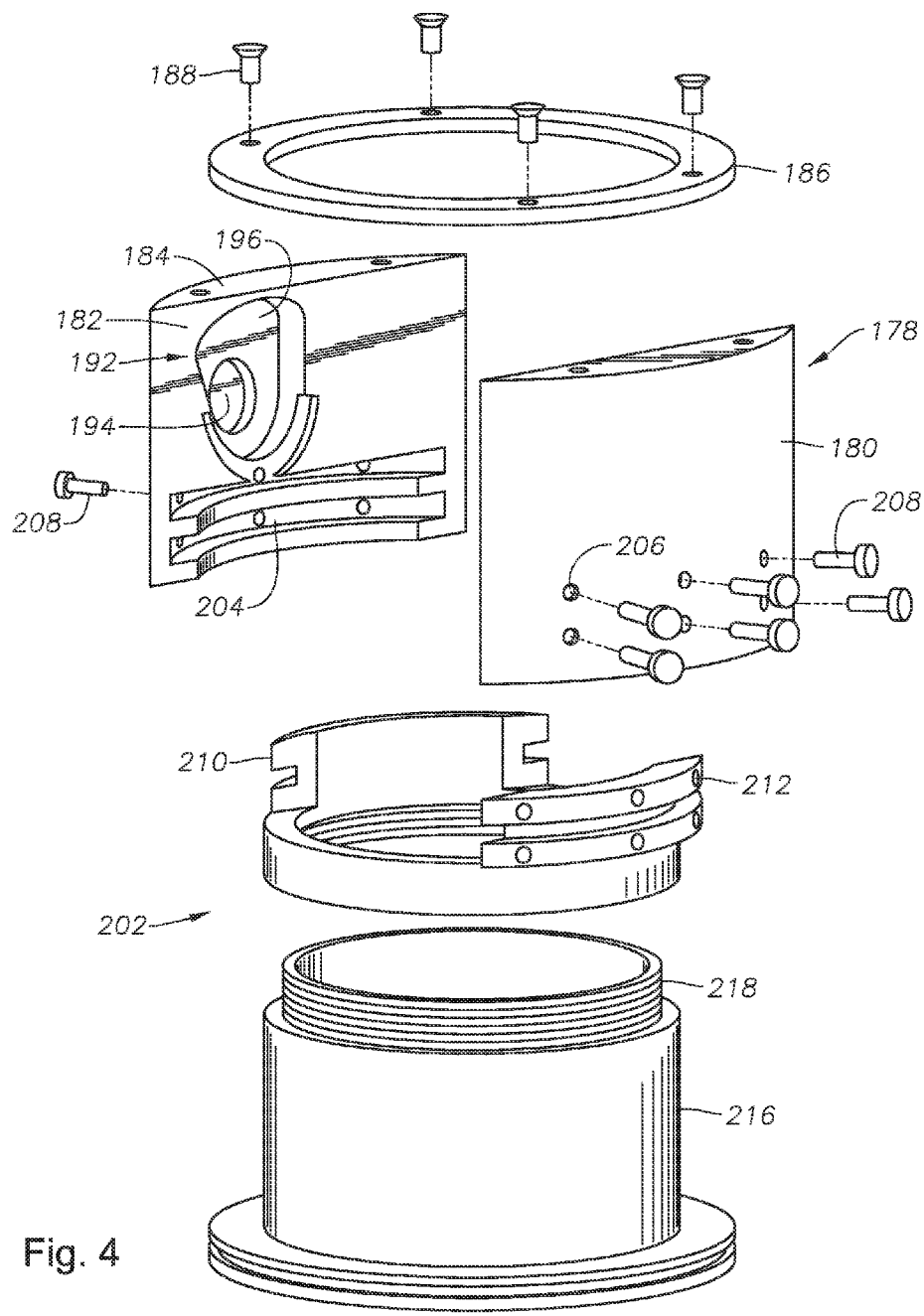
FIG. 4 is an assembly view of the actuation mechanism of the valve assembly of FIG. 1.

Referring to FIGS. 3 and 4, top surfaces 184 of actuation arm 178 can be connected to alignment ring 186 (FIG. 4) by any technique including, for example, by threaded fasteners 188. Alignment ring 186 can facilitate alignment of actuation arms 178 during assembly and can also prevent deflection of alignment arms during operation. Alignment ring 186 can have a predetermined thickness equal to the desired distance between the upper surface of actuation arm 178 and a stop surface. In one embodiment the stop surface can be lower surface 190 (FIG. 1) of inner housing 116. Other surfaces can be used as a stop surface. By having this predetermined thickness, alignment ring 186 can contact a stop surface, such as the lower surface of inner housing 116, when ball passage 124 is properly aligned for a fully open condition. Alignment ring 186, thus, can prevent ball 122 from rotating too far when it is opened.

Actuation arm inner surface 182 (FIG. 4) can have a recess profile 192. Recess profile 192 can be a recess having various features including, for example, bearing support 194 and link arm movement channel 196 (FIG. 4). Bearing support 194 can be, for example, a cylindrical recess to support and secure thrust bearing 198. Link arm movement channel 196 can be sized to permit movement of link arm 138.

Link Arms

As best shown in FIGS. 2 and 5, link arm 138 is a link arm that can transfer force from actuation arm 178 to ball 122. In one embodiment, link arm 138 can include two arms joined by a hinge or pin. The ends of link arm 138 can be connected to thrust bearing 198 and bearing 200 (FIG. 2). Bearing 198 can be located in bearing support 194 on actuation arm recess profile 192. Similarly, bearing 200 can be located in recess 136. When link arm 138 is located in recess profile 192, link arm 138 is substantially covered on all sides by a cavity defined by recess profile 192 and trunnion face 134. In one embodiment, link arm support bearing 201 can be used to support the radius of link arm 138 under high load conditions. In one embodiment, link arm support 201 can be combined with bearing 198 as a single item. The combination of link arm support 201 and bearing 198 can, for example, can be used to maintain correct assembly clearances.

Actuation arm inner surface 182 (FIG. 5), the ball-facing surface, can have features for connecting to crosshead 202 (FIG. 5) such as, for example, groove 204 (FIG. 4). Groove 204 can be a groove located on inner surface 182. Groove 204 can have a contoured bottom, meaning the depth of the groove is deeper near the center of actuation arm inner surface 182 than near the edges. The contoured bottom can facilitate engaging an annular member such that the annular member sits deeper in the groove near the center of actuation arm inner surface, but not as deep near the edges. Actuation arm inner surface can have more than one groove 204. For example, it can have one, two, three, or more grooves 204. In some embodiments, no groove is used. Actuation arm 170 can have apertures 206 for receiving fasteners 208, which can pass through actuation arm 178 into crosshead 202.

Cross Head

Referring to FIGS. 4 and 5, crosshead 202 can be an annular member for transferring force to actuation arm 178. In one embodiment, crosshead 202 can have a flange protruding therefrom, such as first lip 210 and second lip 210. Each crosshead lip 210 can have a profile that fits into groove 204. Crosshead 202 can also have threaded apertures 212 for receiving fasteners 208. In this embodiment, fasteners 208 pass through apertures 206 and engage threaded apertures 212. Fasteners 208 can be preloading bolts, whereby the torque of the bolts creates a preload force between crosshead 202 and actuation arms 178.

Crosshead 202 can have a threaded inner or outer diameter for engaging another member. As shown in FIG. 5, crosshead 202 can have threads 214 on an inner diameter surface. Other couplings can be used to connect crosshead 202 to another member. In one embodiment, crosshead 202 can be connected to piston 216.

Piston

Referring to FIG. 1, piston 216 can be a piston for actuating valve assembly 100. Piston 216 can have a coupling to connect to crosshead 202 such as, for example, threaded connection 218. In the embodiment shown in FIGS. 4 and 5, threaded connection 218 is located on an outer diameter of piston 216 and can, thus, connect to threads 214 on crosshead 202. In some embodiments, other techniques can be used to transfer force between piston 216 and actuation arm 178. In one embodiment, hydraulic connections 118 can connect to fluid passages (not shown) which can lead to piston 216. Other techniques can be used to actuate piston 216.

Seats

Referring to FIG. 1, upper seat 222 can be a seat located at one end of ball enclosure 140. Upper seat 222 can be an annular ring having a sidewall profile that includes a flange such as lip 224. Lip 224 can be an annular protrusion that can fit into upper seat rabbet 170 of ball enclosure 140. Seal 226 can be located between upper seat 222 and ball 122. When ball 122 is in an open position, such that ball passage 124 is aligned with bore 120, as shown in FIG. 1, sealing surface 128 can sealingly engage seal 226 to prevent fluid from departing the flow path and, for example, entering gap 158. When ball 122 is in a closed position, portions of exterior surface 130 can engage seal 226, and ball passage 124 can be transverse, or partially transverse, to bore 120, thereby restricting flow through valve assembly 100. Bottom seat 228 can be a seat located at the other end of ball enclosure 140. Bottom seat 228 can have seat surface 230 and cylinder 232. Like upper seat 222, bottom seat 228 can have a flange, such as lip 234 for engaging lower seat rabbet 172. In one embodiment, a seal (not shown) can be located between bottom seat 228 and ball 122.

Alignment ring 236 can be an annular ring located on an outer diameter of cylinder 232. An outer diameter of alignment ring 236 can engage an inner diameter of piston 216. An upper surface 238 of alignment ring 236 can register against a bottom surface of ball enclosure 140. In one embodiment, ring 236 can be an adjustable ring that can be used to compensate for assembly tolerance errors to ensure that top housing 114 and bottom housing 112 can be correctly seated within upper outer housing 104 and lower outer housing 102, respectively.

Operation

During assembly, ball 122 can be located within enclosure 140 and aligned with upper seat 222 and bottom seat 228 prior to final assembly within housing members such as lower outer housing 102. In operation of an exemplary embodiment, valve assembly 100 can be closed be applying hydraulic pressure on hydraulic connection 118. Doing so can cause piston 216 to move downward. The force of piston 216 can cause actuation arms 178 to move downward. The movement of actuation arms 178 can pull downward on link arms 138. Downward movement of the link arm can be transferred to ball 122. Because ball 122 is constrained by ball enclosure 140 and recess 136 is offset from the axis of trunnion 126, downward force from link arm 138 on recess 136 causes ball 122 to rotate along the axis of trunnions 126. The link arms 138, thus, convert the piston axial force into rotational force for ball closing and shearing operation. Link arm 138, being connected to trunnion face 134, must move normal to side to side within recess profile 192. Recess profile 192 is sized to allow for such movement of link arm 138. Link arm 138, and the bearings connected thereto, can remain enclosed within the cavity defined by recess profile 192 and trunnion face 134 during the movement. Ball 122, being constrained by the interface of trunnion sidewalls 132 and trunnion support aperture 176, can rotate but does not move axially during actuation. Upon closing, exterior surface 130 can engage at seal 226 to deter the flow of fluid through bore 120. When ball 122 is used as a shear valve, the support provided by ball enclosure 140 can prevent or reduce deflection of ball 120 in spite of torque and shear forces caused by closing ball 122 against the elements to be sheared. During upwards piston movement, the alignment of ball passage 124 with the flowpath can be ensured by alignment ring 186, which can be fixed at the top of actuation arms 178. Alignment ring 186 can touch a surface of inner housing 116 during the fully open condition. Alignment ring 186 can also provide stability for the top side of actuation arm during loading. Similarly, alignment ring 236 can facilitate alignment during assembly and operation.

Double Valve Assembly

Referring back to FIG. 1, one embodiment of valve assembly 100 can include more than one ball 122 and the associated members for forming a seal against ball 122. In the embodiment shown in FIG. 1, upper ball assembly 240 can be a seal ball assembly and lower ball assembly 242 can be a shear ball assembly. In this exemplary configuration, lower ball assembly 242 can be used to shear members passing through bore 120 such as, for example, cables or tubing. Lower ball assembly 242 and upper ball assembly 240 can each be constructed as described herein, or one of them can be a different type of valve. In one embodiment, independent controls, such as multiple hydraulic connections 118, can be used to operate lower ball assembly 242 and upper ball assembly 240 independently. In another embodiment, they can be actuated simultaneously.

The embodiments of valve assembly 100 have multiple advantages over previous valve designs. For example, the wrap-around nature of ball enclosure 140 provides greater support for trunnions 126. Ball 122 can experience tremendous torque while closing and opening from, for example, fouling or cables which must be sheared while closing. Flat trunnion plates (not shown) can flex from the torque. Ball enclosure 140, however, provides support in the X, Y, and Z axes and, thus, provides greater resistance to flexion.

Another advantage of the embodiments described herein is the resistance to the ingress of debris. In previous valve designs, debris, such as sand, rock, and thick hydrocarbons, can foul link arms and the ball itself, thus preventing them from moving. In the present embodiments, link arms 138 are enclosed in recess 192. The narrow gap between actuation arm inner surface 182 and both enclosure sidewalls 174 and trunnion face 134 prevents debris and fouling from entering recess 192 and thus fouling link arms 138. Indeed, the debris and fouling that can reach link arms 138 can be no larger than the size of the gap between actuation arm inner surface 182 and enclosure sidewalls 174 and trunnion face 134. Similarly, ball 122 is protected from fouling and debris by ball enclosure 140. Fouling and debris that can reach exterior surface 130 of ball 122 can be no larger than the size of gap 158. Additional advantages of the present invention are apparent from the description of the embodiments herein.

While the invention has been shown or described in only some of its forms, it should be apparent to those skilled in the art that it is not so limited, but is susceptible to various changes without departing from the scope of the invention.

What is claimed is:

1. A method for operating a valve, the method comprising the steps of:
   (a) providing a housing having a longitudinal axis;
   (b) providing a ball enclosure concentrically located and stationarily mounted within the housing, the ball enclosure having a generally spherical interior shape with a pair of bore apertures and a pair of trunnion support apertures;
   (c) providing a ball located within the ball enclosure, having an aperture therethrough, a ball axis of rotation perpendicular to the longitudinal axis, and a pair of trunnions protruding along the ball axis, the trunnions having a generally cylindrical exterior shape that is concentric with the ball axis, with a trunnion face defining an end of the cylindrical exterior shape, the trunnions being rotably engaged in the trunnion support apertures;
   (d) providing an upper seat, the upper seat engaging a first locking profile located on the ball enclosure;
   (e) providing a lower seat connected to the ball enclosure, the lower seat having a lip to engage a second locking profile on the ball enclosure,
   (f) providing at least one link arm having a first end and a second end, the first end being connected to at least one trunnion face and offset from the ball axis and the second end connected to an actuation member, so that when the actuation member moves axially, the second end moves axially, and the first end rotates about the ball axis to cause the ball to rotate within the ball enclosure;
   (g) connecting a piston to the at least one actuation member;
   (h) causing the piston to move in an axial direction, the axial movement of the piston being transferred to the ball via the at least one actuation member and the link arm, to cause the ball to rotate along the ball axis to change the alignment of the passage from a first position to a second position relative to the longitudinal axis.

2. The method according to claim 1, wherein step (f) further comprises substantially enclosing the link arm in a cavity defined by a recess profile on a ball facing surface of the actuation member and a face of the trunnion.

3. The method according to claim 1, wherein step (f) further comprises connecting a link between another one of the trunnions and another actuation member, and connecting an alignment ring to both of the actuation members.

4. The method according to claim 3, further comprising the steps of providing a seat having an annular lip and providing an annular groove in a cylindrical extension of the ball housing, the lip engaging the annular groove.

5. The method according to claim 4, further comprising the step of using the alignment ring to align the actuation members, the ball, the ball enclosure, and the seat before connecting them to the housing.

6. The method according to claim 1, wherein the ball enclosure is a split enclosure and further comprising the step of joining a first side enclosure and a second side enclosure to establish the ball enclosure.

7. The method according to claim 1, wherein step (f) further comprises the step of connecting an annular cross head to the at least one actuation member and to another actuation member by using threaded fasteners, the threaded fasteners creating a preload force on the actuation members, and connecting the piston to the crosshead.

8. The method according to claim 7, further comprising the step of locating a plurality of flanges on the crosshead, each flange extending around at least a portion of the circumference of the crosshead, into a plurality of grooves on a ball facing surface of each of the actuation members.

9. A valve assembly, the valve assembly comprising:
   a housing having a longitudinal axis;
   a ball enclosure concentrically located and stationarily mounted within the housing, the ball enclosure having a generally spherical interior shape with a pair of bore apertures and a pair of trunnion support apertures;
   a ball being located within the ball enclosure, having an aperture therethrough, a ball axis of rotation perpendicular to the longitudinal axis, and a pair of trunnions protruding along the ball axis, the trunnions having a generally cylindrical exterior shape that is concentric with the ball axis, with a trunnion face defining an end of the cylindrical exterior shape, the trunnions being rotably engaged in the trunnion support apertures;
   an upper seat, the upper seat engaging a first locking profile located on the ball enclosure;
   a lower seat connected to the ball enclosure, the lower seat having a lip to engage a second locking profile on the ball enclosure;
   at least one link arm having a first end and a second end, the first end being connected to at least one trunnion face and offset from the ball axis so that when the second end moves axially, the first end rotates about the ball axis to cause the ball to rotate within the ball enclosure; and
   an actuation member, the actuation member having a flat inner side facing the trunnion face, the flat inner side having a recess profile and the link arm located within a cavity defined by the recess profile and the trunnion face, the actuation member operably connected between the link arm and a piston so that axial movement of the piston is transmitted by the actuation member to cause the second end of the link arm to move axially.

10. A valve assembly, the valve assembly comprising:
    a housing having a longitudinal axis;
    a ball enclosure concentrically located and stationarily mounted within the housing, the ball enclosure having a generally spherical interior shape with a pair of bore apertures and a pair of trunnion support apertures;

a ball being located within the ball enclosure, having an aperture therethrough, a ball axis of rotation perpendicular to the longitudinal axis, and a pair of trunnions protruding along the ball axis, the trunnions having a generally cylindrical exterior shape that is concentric with the ball axis, with a trunnion face defining an end of the cylindrical exterior shape, the trunnions being rotably engaged in the trunnion support apertures;

an upper seat, the upper seat engaging a first locking profile located on the ball enclosure;

a lower seat connected to the ball enclosure, the lower seat having a lip to engage a second locking profile on the ball enclosure, and at least one link arm having a first end and a second end, the first end being connected to at least one trunnion face and offset from the ball axis so that when the second end moves axially, the first end rotates about the ball axis to cause the ball to rotate within the ball enclosure.

11. The valve assembly according to claim 10, wherein the ball enclosure is a split enclosure having a first and second member joined by fasteners.

12. The valve assembly according to claim 10, further comprising an actuation member, the actuation member having a flat inner side facing the trunnion face, the actuation member operably connected between the link arm and a piston so that axial movement of the piston is transmitted by the actuation member to cause the second end of the link arm to move axially.

13. The valve assembly according to claim 12, wherein the actuation member is connected to a cross head by bolts, the bolts creating preload between the actuation member and the crosshead to compensate for radial force during operation, and the cross head being connected to the piston.

14. The valve assembly according to claim 13, wherein the actuation member has a pair of grooves on the flat inner side and wherein the cross head has a pair of protrusions, the protrusions engaging the grooves.

15. The valve assembly according to claim 12, wherein the flat inner side of the actuation member has a recess profile and a portion of the link arm engaging the recess profile.

16. The valve assembly according to claim 12, wherein the link arm is substantially surrounded by a cavity defined by the actuation member recess profile and the trunnion face.

17. The valve assembly according to claim 12, further comprising an alignment ring, the alignment ring connected to the actuation member to provide radial and rotational support to the actuation member.

18. The valve assembly according to claim 17, further comprising an inner housing, wherein the alignment ring touches the inner housing when the valve assembly is in a fully open condition.

19. The valve assembly according to claim 10, further comprising a gap between an outer surface of the ball and an inner surface of the ball enclosure, wherein the gap is no greater than a predetermined distance.

20. The valve assembly according to claim 10, further comprising a piston, a bottom seat, the bottom seat having a flange and a cylindrical extension, and a lower alignment ring concentrically located around the cylindrical extension, the lower alignment ring engaging an inner diameter of the piston and the flange engaging a lower groove on the ball enclosure.

* * * * *